United States Patent [19]

Dye et al.

[11] Patent Number: 5,366,422

[45] Date of Patent: * Nov. 22, 1994

[54] END-THRUST DESIGN FOR PARALLEL-AXIS DIFFERENTIAL

[75] Inventors: James S. Dye, Walworth; Gordon B. Tseng, Rochester, both of N.Y.

[73] Assignee: Zexel-Gleason USA, Inc., Rochester, N.Y.

[*] Notice: The portion of the term of this patent subsequent to Dec. 8, 2009 has been disclaimed.

[21] Appl. No.: 154,605

[22] Filed: Nov. 18, 1993

Related U.S. Application Data

[60] Division of Ser. No. 986,100, Dec. 4, 1992, abandoned, which is a continuation of Ser. No. 735,441, Jul. 25, 1991, Pat. No. 5,169,370.

[51] Int. Cl.$^5$ ............................................. F16H 1/42
[52] U.S. Cl. ................................... 475/249; 475/252
[58] Field of Search .................. 475/226, 227, 249, 252

[56] References Cited

U.S. PATENT DOCUMENTS

| | | | |
|---|---|---|---|
| 1,195,314 | 8/1916 | Williams | 475/227 |
| 1,373,657 | 4/1921 | Finefrock | 475/227 |
| 2,000,223 | 5/1935 | Du Pras | 475/227 |
| 2,269,734 | 1/1942 | Powell | 475/227 |
| 2,462,000 | 2/1949 | Randall | 475/227 |
| 2,900,846 | 8/1959 | Lehman | 475/227 |
| 2,972,265 | 2/1961 | Walter | 475/227 |
| 3,095,761 | 7/1963 | Hilado | 475/227 |
| 3,292,456 | 12/1966 | Saari | 475/227 |
| 3,706,239 | 12/1972 | Myers | 475/227 |
| 3,738,192 | 6/1973 | Belansky | 475/227 |
| 4,677,876 | 7/1987 | Dissett | 475/227 |
| 4,916,978 | 4/1990 | Razelli et al. | 475/226 |
| 5,122,101 | 6/1992 | Tseng | 475/252 |
| 5,169,370 | 12/1992 | Dye et al. | 475/227 |
| 5,232,416 | 8/1993 | Amborn et al. | 475/249 X |

FOREIGN PATENT DOCUMENTS

| | | | |
|---|---|---|---|
| 130806 | 1/1985 | European Pat. Off. | 475/226 |
| 0356401 | 2/1990 | European Pat. Off. | |
| 899549 | 6/1945 | France | |
| 951431 | 10/1949 | France | 475/249 |
| 2256350 | 7/1975 | France | |
| 2566080 | 12/1985 | France | 475/227 |
| 59-97346 | of 1984 | Japan | 475/249 |
| 237300 | 8/1945 | Switzerland | |
| 27123 | of 1912 | United Kingdom | 475/226 |
| 2234791 | 2/1991 | United Kingdom | 475/227 |

Primary Examiner—Dirk Wright
Assistant Examiner—Khoi Q. Ta
Attorney, Agent, or Firm—Eugene Stephens & Associates

[57] ABSTRACT

Frictional resistance, resulting from end thrust developed by planetary gearing, is appreciably increased to improve control over torque bias characteristics in parallel-axis/torque-proportioning automotive differentials using an unusual planetary combination gear having a first toothed portion which meshes with one of the differential's sun/side gears and a second toothed portion which meshes with a paired combination gear, these first and second toothed portions being separated by a non-meshing portion that "straddles" (i.e., that provides clearance for avoiding contact with) the sun gear that is in mesh with its paired combination gear. In the most preferred embodiments, the second toothed portion of each combination gear is divided into two separate and distinct meshing areas located, respectively, at the gear's outer axial ends. The end faces of the combination gears are used as frictional surfaces for controlling the torque bias of the differential assembly, and a significant measure of control over torque bias is provided by the appropriate selection of the angle and hand of the helically-toothed meshing portions of the sun and planetary combination gears, such tooth designs being selected so that the axial-thrust forces created on the combination gears result in additional frictional resistance.

17 Claims, 5 Drawing Sheets

END-THRUST DESIGN FOR PARALLEL-AXIS DIFFERENTIAL

This application is a Division of allowed copending parent U.S. application Ser. No. 986,100, filed Dec. 4, 1992, abandoned by James S. Dye and Gordon Bae-Ji Tseng, entitled END-THRUST DESIGN FOR PARALLEL-AXIS DIFFERENTIAL, Batch No. S04, which is a Continuation of grandparent U.S. application Ser. No. 735,441, filed Jul. 25, 1991, by James S. Dye and Gordon Bae-Ji Tseng, entitled END-THRUST DESIGN FOR PARALLEL-AXIS DIFFERENTIAL, now U.S. Pat. No. 5,169,370, issued Dec. 8, 1992. The parent application is hereby incorporated by reference.

TECHNICAL FIELD

The invention relates to torque-proportioning type automotive differentials having planetary gear arrangements carried within housings that are rotatable about a pair of drive axles interconnected by the planetary gear arrangements.

BACKGROUND OF INVENTION

Gear differentials generally include compound planetary gear sets interconnecting a pair of drive axles to permit the latter to rotate in opposite directions with respect to a differential housing. The drive axles rotate about a common axis; and so-called "side" gears are fixed for rotation with the inner ends of the two drive axles, such side gears acting as the sun gear members of the compound planetary gear sets. The sun gears are interconnected by so-called "element" or "combination" gears, which form the planet gear members of the sets. The planet gears are mounted for rotation about axes that may be variously offset and inclined with respect to the common axis of the sun gears and drive shafts.

The relative positions of the sun and planet gear axes usually determine the kind of gearing that make up the planetary gear sets: Parallel axes are used for mounting spur or helical gears, e.g., see U.S. Pat. Nos. 2,269,734 (Powell); 2,972,265 (Walter); and 3,095,761 (Hilado); and orthogonal axes are used for mounting either bevel or worm gears, depending upon the presence of any offset between the axes. That is, bevel gears are used when the sun and planet gear axes intersect, while worm gears are used when the gear axes do not intersect (as an example of this latter type, see U.S. Pat. No. 1,373,657 to Finefrock).

The entire planetary gearing arrangement within the differential supports opposite relative rotation between the drive axle ends (i.e., differentiation), which is necessary to permit the axle ends to be driven at different speeds. Torque transmitted to the drive axles through the inclined tooth surfaces of the sun gears generates thrust forces against gear-mounting bearing surfaces within the differential. (Such bearing surfaces may comprise journals formed in the housing, or may be the ends of bores into which the gears are received, or may be special washers positioned between the end faces or shaft ends of the gears and the housing.) The thrust forces, together with other loads conveyed by the gear meshes in the planetary gearing, produce a frictional resistance to relative rotation between the drive axles, this frictional resistance being proportional to the torque applied to the differential housing. The proportional frictional resistance supports different amounts of torque between the two drive axles to prevent their relative rotation until the characteristic "bias" ratio of the planetary gearing arrangement is reached. Once the frictional resistance is overcome and differentiation begins, the torque difference between the axles is proportioned in accordance with the bias ratio. Differentials that divide torque in a substantially constant ratio between relatively rotating drive axles are referred to as "torque-proportioning" differentials.

The ability to support different amounts of torque between the drive axles is of great benefit to improving traction capabilities of vehicles. Ordinarily, when one wheel of a vehicle with a conventional differential loses traction, the amount of torque that can be delivered to the other drive wheel is similarly reduced. However, when one wheel loses traction so that there is differentiation between the two axles, torque-proportioning differentials deliver an increased amount of torque to the drive wheel having better traction, such increased torque being determined by the characteristic bias ratio of the differential.

A wide variety of torque-proportioning differentials were developed more than seventy-five years ago to facilitate automotive travel over the muddy, unpaved roads that were used to supply the trenches in World War I; and these early designs have been improved over and over again since that time. Some well-known designs use planetary gearing assemblies with orthogonal axes (e.g., the above-cited Finefrock Patent), while others use gearing assemblies with parallel axes. Examples of the latter type are the above-cited Powell, Walter, and Hilado Patents as well as U.S. Pat. Nos. 1,195,314 (Williams); 2,000,223 (DuPras); 2,462,000 (Randall); and, more recently, 3,706,239 (Myers), this latter design supporting the gears in housing pockets rather than by shafts received in conventional journal bores.

In general, the gears used in parallel-axis/helical gear assemblies are often simpler to manufacture than are the gears used in torque-proportioning designs of the orthogonal-axis/worm-gear type. However, when the latter are made with the same number of sun and planet elements as the former, they usually develop greater frictional resistance between their respective gear meshes and support bearings; and this, in turn, provides greater torque bias and/or increased control over the bias ratio. A significant portion of the torque bias of such orthogonal-axis designs is related to the frictional resistance developed by the cumulative axial forces (hereinafter referred to as "end thrust") developed by their sun gears and by their planet gears when the differential is subjected to torque. In contrast, such cumulative end thrust has not heretofore been a significant contributor to the torque bias developed by parallel-axis designs.

That is, even though there are several basic prior-art designs for parallel-axis differentials of the torque-proportioning type which make use of the frictional resistance generated by end thrust, we are aware of none that utilizes cumulative end thrust developed by both sun and planet gears for the purpose of creating a substantial portion of the torque bias between the axles. For instance, one of these basic designs is exemplified by the above-cited U.S. Patents to DuPras, Powell, Randall, Walter, and Myers. In this basic prior-art design, helical sun gears of opposite hand are in mesh with one or more pairs of helical planet combination gears which, in turn, are in mesh with each other. While this design produces end thrust on the sun gears, no significant end thrust is developed by the planet gear pairs due to the fact that the end thrust created by the helical teeth in mesh with the sun gear is opposed by a contrary end thrust created by the same hand helical teeth which are used for the interconnection between the planet gear pair.

A second basic parallel-axis design is exemplified by the torque-proportioning differentials disclosed in the above-cited U.S. Patents issued to Williams and Hilado. In this second basic design, the pairs of planet gears mesh with each other by means of helical gearing, while using spur gear teeth for the meshing connection with their respective sun gears. This prior-art arrangement produces end thrust on the planet combination gears, but it does not develop any significant end thrust on the sun gears.

There are other known designs for parallel-axis/-torque-proportioning differentials in which, instead of mounting the planet gears in pairs, the gears are mounted in a continuous circular mesh around the full circumference of each respective side gear, e.g., see U.S. Pat. No. 3,738,192 (Belansky). However, like the two basic designs just discussed above, none of these continuous circular mesh designs is directed to controlling the cumulative end thrust independently developed by both sun and planet gears for the purpose of creating a substantial portion of the torque bias.

The invention claimed herein improves such parallel-axis torque proportioning differentials by balancing the load on the planetary gear mounting supports, by increasing the number of frictional surfaces, and by maximizing utilization of the cumulative end thrust developed by both sun and planet gears for the purpose of creating a significant portion of the differential's torque bias, thereby permitting increased control over bias ratio.

SUMMARY OF THE INVENTION

The invention comprises improved parallel-axis planetary gearing for use in automotive differentials of the torque-proportioning type. The sun gears of the differential, which are adapted to be fixed to the ends of the coaxial drive axles, are interconnected by at least one planetary pair of combination gears. Each combination gear of the pair has two engagement portions: a first toothed portion having helical teeth for meshing with a respective one of the sun gears, and a distinct second toothed engagement portion for meshing with its paired combination gear.

The invention makes simple modifications to the design of these meshing engagement portions of the gears to provide greater torque bias between the interconnected axles than has heretofore been achieved with similar parallel-axis differentials. This additional torque bias is created by increasing the cumulative frictional resistance resulting from end thrust developed by the differential's various gear components. Each planet gear is mounted in the differential housing for rotation about an axis parallel to the common axis of the axles, and for axial motion (a) in relation to, and for contact with, at least one bearing surface, and (b) in relation to its paired planet gear. That is, each planet gear is free to move axially in response to the end-thrust forces developed by the gearing assembly for increasing frictional resistance to the relative rotation of the axles.

The first toothed engagement portion of each combination gear is provided with helical teeth designed to develop axial end thrust in the direction of a bearing surface when the combination gear is subjected to torque. Further, in the preferred embodiment the second engagement portion of each combination gear is specifically designed with gear teeth which develop no end thrust in a direction opposite to the end thrust developed by the gear's first engagement portion. Therefore, each helical sun gear and each planet combination gear develops end thrust whenever torque is transferred between the respective axles; and this cumulative end thrust is not diminished by the reaction forces acting on the gear mesh which interconnects each pair of combination gears. That is, the invention's preferred design for the planet gears of parallel-axis/torque-proportioning differentials improves such differentials for the first time so that the combined end thrust exerted by the planet gears is at least equal to the end thrust exerted by the sun gears; and in some embodiments of the invention, the end thrust exerted by the planet gears is greater than the end thrust exerted by the sun gears.

If the second toothed engagement portions of each combination gear pair are designed with helical teeth of opposite hand to the helical teeth of their respective first engagement portions, these latter teeth also develop end thrust; and this additional end thrust is in the same direction as the end thrust developed by the helical teeth of the first engagement portion. Therefore, in the second arrangement, each combination gear develops even greater end thrust to add to the cumulative frictional resistance for creating the desired torque bias between the axles.

The invention is preferably applicable to parallel-axis differential assemblies using an unusual type of combination gear in which the gear's first and second toothed engagement portions are separated by a non-meshing portion that "straddles" (i.e., that provides clearance for avoiding contact with) the sun/side gear that is in mesh with its paired combination gear. Further, in the preferred embodiments illustrated, the second toothed engagement portion of each combination gear (i.e., the portion in mesh with its paired combination gear) is divided into two separate and distinct meshing areas that straddle its first engagement portion which is in mesh with the sun gear. These latter two shared-but-separated meshing areas are preferably located at the outer ends of each combination gear, thereby dividing the loads shared by these combination gears and positioning those loads as near as possible to the outer ends of their axial supports. (This unusual form of planet combination gear is disclosed in commonly-assigned U.S. Pat. No. 5,122,101, issued Jun. 16, 1992, to Gordon Bae-Ji Tseng, and entitled PARALLEL-AXIS COMBINATION GEAR DIFFERENTIAL, the disclosure of which is hereby incorporated by reference.)

The detailed disclosure below describes three illustrated embodiments of such straddle-type combination gears. In two of these embodiments, which are preferred, the second engagement portions of each combination gear (which mesh with its paired combination gear) have gear tooth designs which develop additional end thrust that is in the same direction as the end thrust developed by the combination gear's first engagement portion (which meshes with its respective sun gear). Therefore, in these latter two preferred embodiments, the end faces of the combination gears are used more effectively as frictional surfaces for controlling the torque bias of the differential assembly, and a significant measure of control over torque bias is provided by the appropriate selection of the angle and hand of the helically-toothed meshing portions of the sun and combination gears, such tooth design being selected so that the axial-thrust forces created on the combination gears result in additional frictional resistance.

DRAWINGS

FIGS. 1a and 1b are schematic perspective views of the simplified planetary gear assemblies of two basic designs of prior-art parallel-axis/torque-proportioning differentials; and FIGS. 1c and 1d are similar views of two such differentials modified according to the invention.

FIGS. 2a, 2b, 2c, and 2d are schematic diagrams relating, respectively, to the planetary gear assemblies shown in FIGS. 1a, 1b, 1c, and 1d and showing the direction of end-thrust forces in each such assembly under the same assumed torque conditions.

FIG. 3a is a schematic perspective view of the simplified planetary gear assembly of a different design of parallel-axis/torque-proportioning differential; and FIGS. 3b and 3c are two similar views of such a differential modified according to the invention.

FIGS. 4a, 4b, and 4c are schematic diagrams relating, respectively, to the planetary gear assemblies shown in FIGS. 3a, 3b, and 3c and showing the direction of end-thrust forces in each such assembly under the same assumed torque conditions.

FIG. 5 is a schematic cross-sectional view of a portion of still another design of parallel-axis/torque-proportioning differential modified according to the invention.

DETAILED DESCRIPTION

Figure 1A:
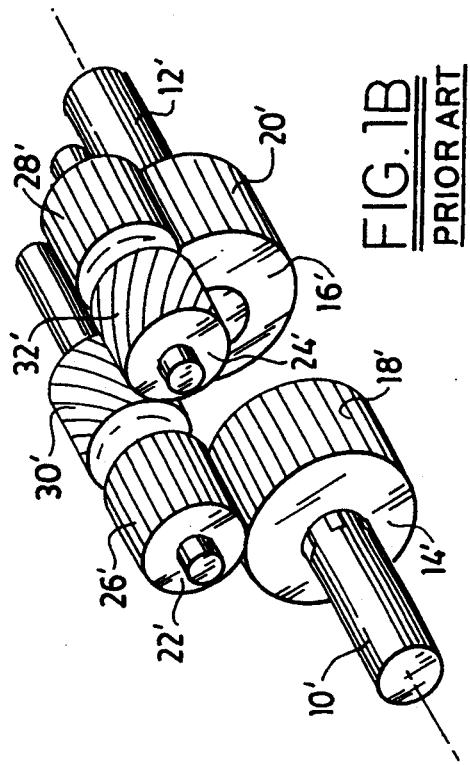
Figure 1C:
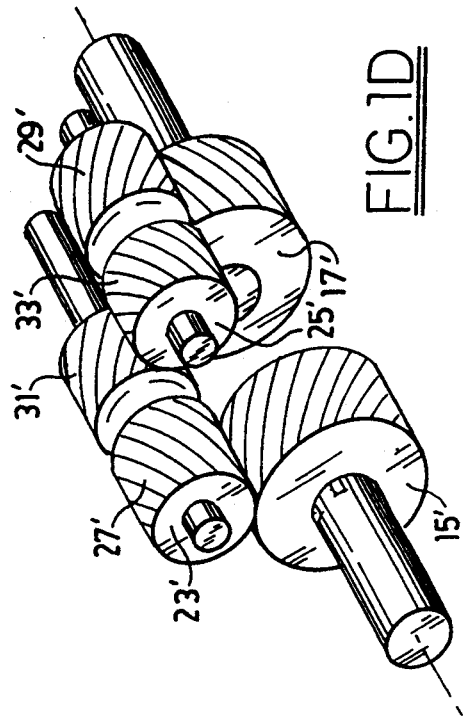
Figure 1B:
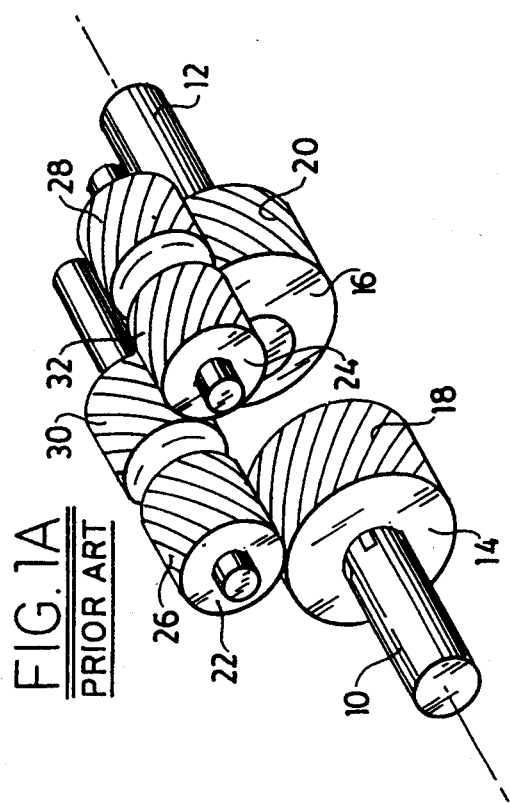

FIGS. 1a and 1b show the planetary assemblies of the two basic types of parallel-axis differentials referred to above in the Background section.

Referring to the planetary arrangement shown in FIG. 1a, a pair of axles 10, 12 are splined to a respective pair of helical sun gears 14, 16. Sun gear 14 has teeth 18 having a right hand helix angle, while sun gear 16 has teeth 20 with a left hand helix angle. Sun gears 14, 16 mesh, respectively, with the first engagement portions 26, 28 of a pair of planet combination gears 22, 24 which are also each provided with a second engagement portion 30, 32, these latter engagement portions being in mesh with each other. In this prior-art design, both the first and second engagement portions of each of the combination gears have similar helix angles. That is, first engagement portion 26 of combination gear 22 has left hand helical teeth designed to mesh with the right hand helical teeth 18 of sun gear 14, and the second engagement portion 30 of combination gear 22 is also provided with left hand helical teeth. In contrast, first engagement portion 28 of combination gear 24 has right hand helical teeth designed to mesh with the left hand helical teeth 20 of sun gear 16. Second engagement portion 32 of combination gear 24 also has right hand helical teeth appropriate to mesh with the left hand helical teeth of portion 30 of combination gear 22.

In the prior-art design illustrated in FIG. 1b, the planetary arrangement is similar to the just-described prior-art arrangement shown in FIG. 1a; and similar reference numerals have been assigned to the respective sun and planet gears. The primary differences between these two prior-art assemblies lies in the design of the teeth of their respective gears. Namely, sun gears 14', 16' are both provided with spur teeth 18', 20' which mesh, respectively, with similar spur gear portions 26', 28', of combination gears 22', 24'. The second engagement portions 30', 32' which are used to interconnect the combination gears with each other, are provided with mating left and right hand helical teeth.

Figure 2A:
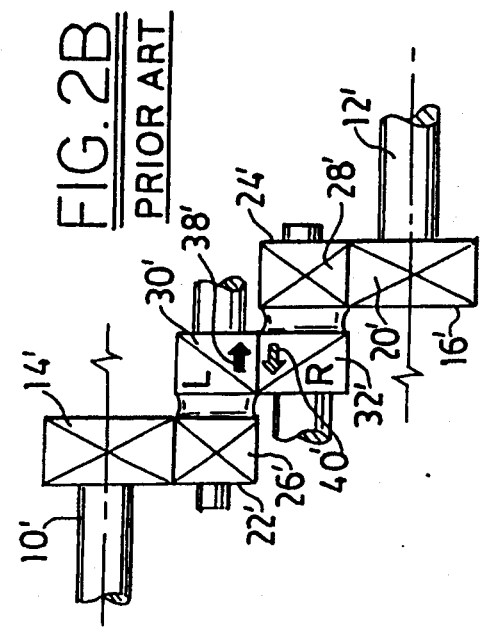
Figure 2B:
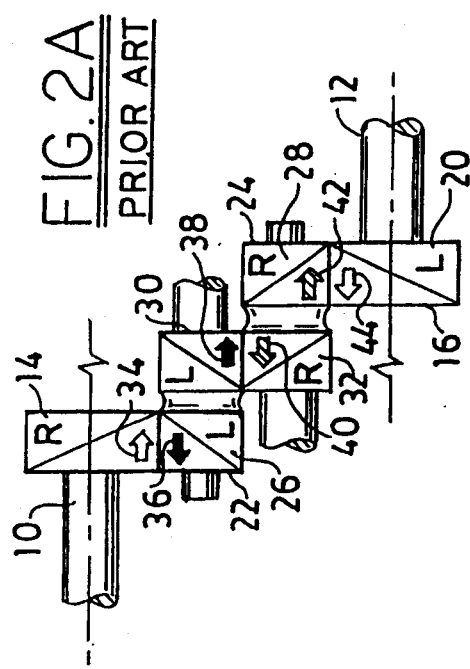

Reference is now made to FIGS. 2a and 2b which, respectively, schematically diagram the end-thrust forces developed by the just-described prior-art assemblies shown in FIGS. 1a and 1b. In these schematics, the common axis of the sun gears has been separated for simplification, sun gears 14, 14' being shown at the top of each diagram, while sun gears 16, 16' are positioned at the bottom of each diagram. In FIGS. 2a and 2b, as well as in all of the other schematic force diagrams in FIGS. 2, 4, and 5, it is assumed (a) that the differential is in a "drive" (as distinguished from "coast") mode, the vehicle being driven forward by its engine, and (b) that torque is divided between the two axles such that the sun gear with the lower reference numeral is being subjected to the greater torque in a clockwise direction when viewed from the left hand side of the drawing. Also, as used in the following description and claims, the term "end thrust" is intended to describe only those axial forces which arise due to the helix angle of the gearing. That is, this term ignores the generally less significant end-thrust forces that occur due to mesh friction, slight axial misalignments, etc.

Further, to facilitate understanding of the determination of end thrust in the force diagrams, reference can be made to Table 1 (taken from *Gear Handbook* by Darle W. Dudley, Editor, First Edition, McGraw-Hill Book Co., 1962) which indicates the direction of axial thrusts on driving and driven helical gears.

TABLE 1

| Direction of Axial Thrusts on Driving and Driven Gears | | | |
| --- | --- | --- | --- |
| Hand of Spiral | Direction of Rotation | Driving | Driven |
| Left | Clockwise | Toward viewer | Away from viewer |
| | Counterclockwise | Away from viewer | Toward viewer |
| Right | Clockwise | Away from viewer | Toward viewer |
| | Counterclockwise | Toward viewer | Away from viewer |

Therefore, in the schematically illustrated prior-art planetary assembly of FIG. 2a, it is assumed that gear 14 is subjected to greater torque than gear 16, that gear 14 is a driving gear, and that gear 16 is a driven gear. Also, it is assumed that the torque is acting on gear 14 in a clockwise direction. In view of the right hand spiral of its helical teeth 18, an end thrust is developed on gear 14 in the direction of open arrow 34. Since gear 14 is in mesh with the left hand helical teeth of first engagement portion 26 of gear 22, driving the latter gear in a counterclockwise direction, this subjects gear 22 to end-thrust forces in the direction of solid arrow 36. The left hand teeth of second engagement portion 30 of gear 22 are also subjected to a counterclockwise torque, but portion 30 is in driving relation to the teeth of paired combination gear 24. This produces end-thrust forces on combination gear 22 in the direction of solid arrow 38; and the right hand teeth of second engagement portion 32 of combination gear 24, being driven in a clockwise direction, develop end-thrust forces indicated by hatched arrow 40. The right hand teeth of first engagement portion 28 of combination gear 24 drive the left hand helical gear teeth 20 of sun gear 16, this latter mesh resulting in end-thrust forces on combination gear 24 and sun gear 16 in the respective directions indicated by hatched arrow 42 and open arrow 44.

Therefore, while the prior-art assembly shown in FIGS. 1a and 2a develops end thrust on sun gears 14, 16, it can be seen from solid arrows 36, 38 and hatched arrows 40, 42 that the end-thrust forces acting on each of the two combination gears 22, 24 are in opposition, resulting in no appreciable effective end thrust being developed by either of these planet gears.

FIG. 2b is a schematic force diagram relating to the prior-art planetary assembly shown in FIG. 1b in which both sun gears 14', 16' and the first engagement portions 26', 28' of combination gears 22', 24' are all provided with spur teeth. Therefore, the clockwise driving torque experienced by sun gear 14' does not result in the development of any end thrust on either gear 14' or on the driven portion of combination gear 22'. However, the counterclockwise torque to which combination gear 22' is subjected causes the left hand helical teeth of portion 30' of gear 22' to drive the right hand helical teeth of portion 32' of gear 24' in a clockwise direction, resulting in respective end-thrust forces indicated by solid arrow 38' and hatched arrow 40'. Again, the meshing engagement of the spur teeth of sun gear 16' and portion 28' of combination gear 24' do not produce any end-thrust forces. As a result, the sun gears in this prior-art arrangement do not develop end-thrust forces, but each of the planet gears develops the respective end-thrust forces just identified above.

Figure 1D:
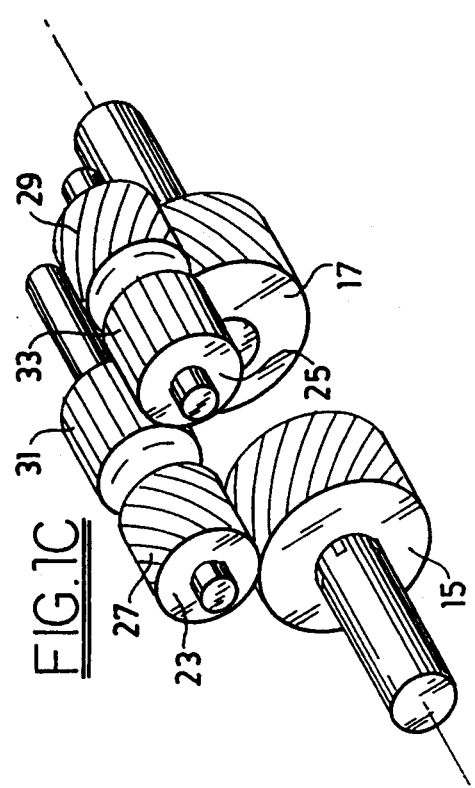

It can be seen from FIGS. 2a and 2b that the two basic prior-art planetary gear assemblies develop significant end thrust on either the sun gears or the planet combination gears, but do not provide such end thrust cumulatively on both the sun gears and the planet gears. However, it is exactly such cumulative end thrust that is provided by the invention herein. FIGS. 1c and 1d disclose two simplified embodiments of the invention which, while similar to the prior-art assemblies just discussed above, include modifications that provide the inventive assemblies with significantly more end thrust for increasing frictional resistance and, thereby, augmenting the characteristic bias of the differential.

Figure 2C:
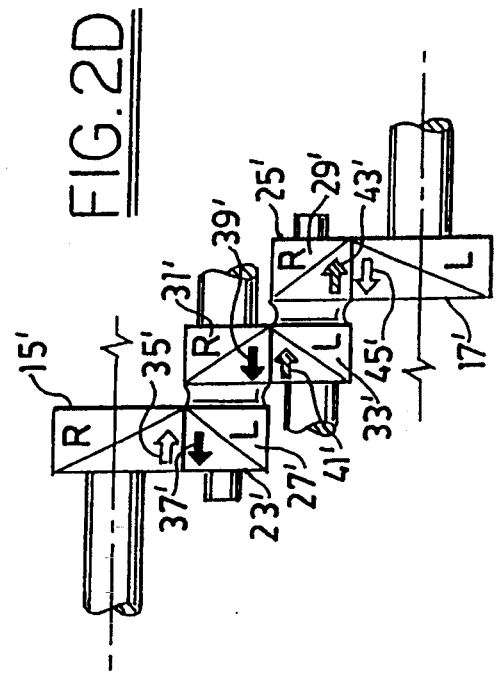

In the inventive embodiment shown in FIG. 1c, the pair of sun gears 15, 17 has respective sets of helical teeth with opposite hand spirals; and these gears are in mesh with the first engagement portions 27, 29 of a pair of planet combination gears 23, 25 which are interconnected by means of the meshing spur teeth of their respective second engagement portions 31, 33. The end-thrust forces resulting from this gear arrangement are illustrated in FIG. 2c. Applying the same assumptions used above in regard to the analysis of the prior-art assemblies, right hand helical sun gear 15 is subject to a clockwise torque, and this imparts a counterclockwise torque to driven portion 27 of combination gear 23 and produces the relative end-thrust forces indicated by open arrow 35 and solid arrow 37, respectively. While portion 33 of combination gear 25 is driven clockwise by the counterclockwise torque from portion 31 of combination gear 23, these spur gears do not develop any end thrust. However, the mesh between the driving right hand helical gear portion 29 of combination gear 25 and the driven left hand helical teeth of sun gear 17 develops the end-thrust forces on their respective gears as indicated by hatched arrow 43 and open arrow 45. As indicated by the thrust arrows in FIG. 2c, the embodiment disclosed in FIG. 1c develops end thrust on both sun gears and on both planet combination gears. Thus, the relatively simple change of gear tooth arrangements, as compared to the prior-art assembly shown in FIG. 2b, has resulted in an appreciable increase in the frictional resistance of the assembly by adding to the frictional resistance between the sun and planet gears and their respective bearing surfaces. (NOTE: While FIGS. 1 through 4 omit these respective bearing surfaces, the relationship between the sun and planet gears and their respective bearing surfaces will be understood by persons skilled in the art, and this relationship is shown for one specific embodiment described below and illustrated in FIG. 5.)

The embodiment shown in FIG. 1d is similar to that just shown in FIG. 1c in that sun gears 15', 17' have right and left hand helical teeth, respectively, which mesh with left and right hand helical portions 27', 29' of combination gears 23', 25'. However, instead of being interconnected by spur teeth, the second engagement portion 31' of combination gear 23' has right hand helical teeth and meshes with the left hand helical teeth of portion 33' of combination gear 25'.

Figure 2D:
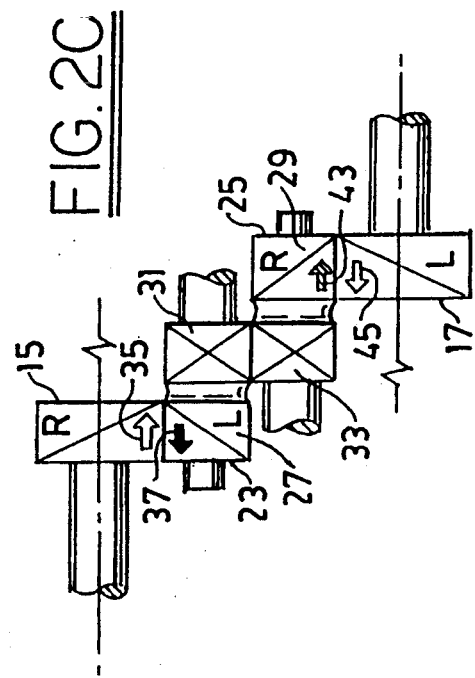

As can be seen from the schematic force diagram in FIG. 2d, the mesh between driving sun gear 15' and driven portion 27' of combination gear 23' develops end thrust (indicated by arrows 35' and 37') similar to the end thrust developed in the first embodiment of the invention shown in FIG. 1c; and the mesh between driving portion 29' of combination gear 25' and sun gear 17' produces similar end thrust on each of these gears as indicated by arrows 43' and 45'. However, in this embodiment, the respective right and left hand helical teeth of second engagement portions 31', 33' of the combination gears produce additional end thrust indicated by arrows 39', 41'. Since the resulting end thrust developed by both portions 27', 31' of combination gear 23' (indicated by arrows 37', 39') is in the same direction, appreciable additional friction is developed between combination gear 23' and its bearing surface within the differential housing (not shown). Similarly, the end-thrust forces developed by both portions 29', 33' of combination gear 25' (indicated by hatched arrows 41', 43') are also in the same direction, thereby adding appreciably to the frictional resistance between the latter combination gear and its respective bearing surface.

When this second embodiment of the invention is compared to the similar prior-art assembly analyzed in FIG. 2a, it becomes quite apparent that the relatively simple design modifications of the invention produce a significant increase in the differential's effective end-thrust forces.

Figure 3A:
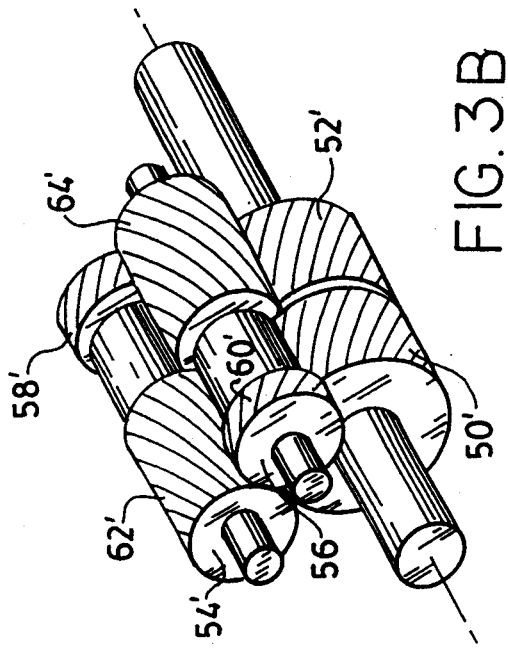

Reference is now made to the differential assembly in FIG. 3a which is a schematic representation, in simplified perspective view, of the parallel-axis planetary gearing arrangement disclosed in the commonly-assigned U.S. Patent entitled "Parallel-Axis Combination Gear Differential" referred to above. In this torque-proportioning differential, the helical sun gears 50, 52 are interconnected by a pair of planet combination gears 54, 56. Each combination gear is in mesh with a respective one of the sun gears, and the paired combination gears are also in mesh with each other. In this embodiment, the combination gears are in mesh with each other at two separated meshing areas. This relationship can best be seen in the symbolic diagram illustrated in FIG. 4a in which, for purposes of simplification, the basic planetary arrangement has been unwrapped so that the two sun gears 50, 52 are shown at the top and bottom of the symbolic arrangement, their common axis having been split as indicated in the manner similar to that used in the FIG. 2 schematics.

Figure 3B:
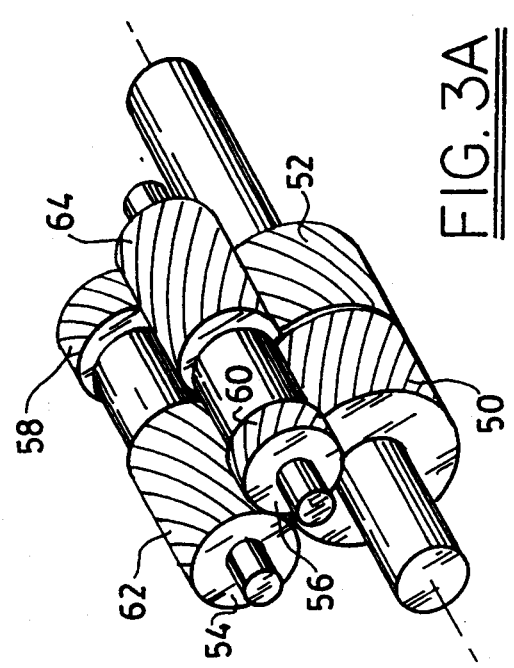
Figure 3C:
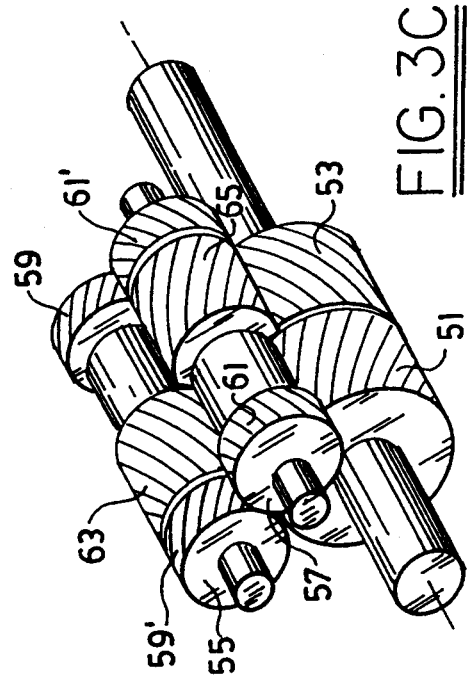
Figure 4C:
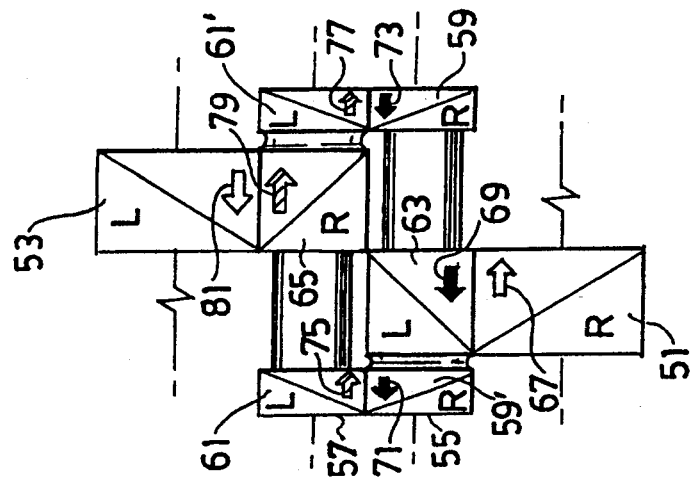
Figure 4B:
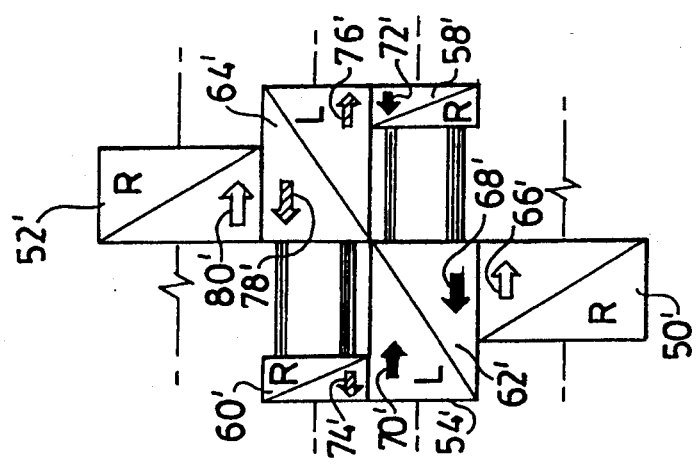
Figure 4A:
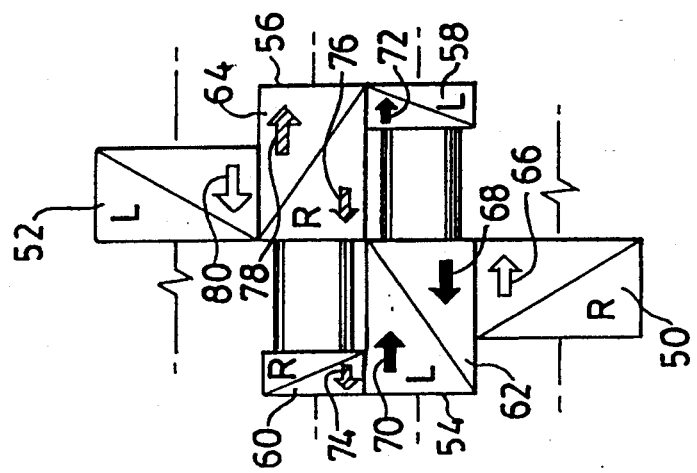

FIGS. 3a and 4a illustrate, in perspective and schematically, a gear assembly in the unusual parallel-axis differential arrangement that is explained in greater detail in the disclosure of the commonly-assigned U.S. Pat. No. 5,122,101 just identified above, which disclosure is incorporated herein by reference. FIGS. 3b, 4b and 3c, 4c show similar views of two further preferred embodiments of this same differential arrangement modified according to the invention, and these arrangements will be described in terminology similar to that used above in the explanations of the gear assemblies illustrated in FIGS. 1a through 2d.

In FIGS. 3a and 4a, a first combination gear 54 has a first toothed portion 62, that is in mesh with a sun gear 50, and a second toothed portion 58 that is in mesh with one end of a paired combination gear 56. Toothed portions 58 and 62 are separated by a non-meshing portion that straddles the sun gear 52 that is in mesh with paired combination gear 56. Area 64 of gear 56 combines both the first and second helically-toothed portions of combination gear 56 in a single, elongated contiguous format. Therefore, the separated first and second toothed portions 58, 62 of gear 54 and the contiguous first and second toothed portions 64 of gear 56 interconnect these two planetary gears with side/sun gears 50, 52 in a mutual driving relationship.

However, to better balance the loads shared by combination gears 54, 56 in this mutual driving relationship, the second toothed portion of each combination gear (i.e., that portion which meshes with its paired combination gear) is divided into two separated areas that straddle the respective positions where each combination gear meshes with its associated sun gear. In the preferred embodiments illustrated, these two shared meshing areas of each pair of combination gears are positioned, respectively, in proximity to the axial ends of each combination gear 54, 56. That is, in this preferred arrangement, gear 56 is also provided with a contiguous meshing area 64 which, like area 62 of gear 54, combines its first toothed portion with one of the separated areas of the second engagement portion it shares with its paired combination gear 54, while gear 56 is provided with an axial end portion 60 similar to axial end portion 58 of gear 54.

In the assembly shown in FIG. 3a, the elongated meshing portion 62, 64 and the axial end portion 58, 60 of each planet combination gear have helical teeth of the same hand, both portions of gear 54 having left hand helical teeth and those of gear 56 having right hand helical teeth. FIG. 4a shows the end-thrust forces developed when torque driven by sun gear 50 is transferred through this assembly. Again, reference is made to Table 1, and it is assumed that gear 50 is subjected to a clockwise torque when the assembly is viewed from the left. The clockwise driving rotation of gear 50 develops the end thrust indicated by open arrow 66, while the driven left hand helical teeth of elongated meshing portion 62 develop end thrust in the direction of solid arrow 68. At the same time, the portions of combination gear 54 which are in mesh with its paired combination gear 56 develop end thrust indicated by solid arrows 70, 72. The two separated sets of driven right hand helical teeth of combination gear 56 produce end thrust indicated by shaded arrows 74, 76, while the driving right hand helical teeth of portion 64 develop end thrust in the direction of shaded arrow 78. The driven left hand helical teeth of sun gear 52 develop end thrust in the direction of open arrow 80. The aggregation of these end-thrust forces results in increased frictional resistance between sun gears 50, 52. However, since the torque transferred between sun gear 50 and combination gear 40 is approximately equal to the torque being transferred between combination gear 56 and sun gear 52, little, if any, end thrust is developed over either of the combination gears due to the opposite directions of end thrust indicated by the respective sets of solid and hatched arrows.

Referring now to FIGS. 3b and 4b, the assembly of FIG. 3a has been modified in accordance with the invention to increase the frictional resistance developed between the housing and the end faces of the combination gears. In this embodiment, sun gears 50', 52' both have right hand helical gears, while the axial end portions 58', 60' of each planet combination gear 54', 56' have helical teeth of opposite hand to the teeth of elongated meshing portions 62', 64'. When this modified assembly is subjected to similar torque transfer conditions as that just assumed in the explanation above relating to FIGS. 3a and 4a, end thrusts are developed on sun gears 50', 52' in the direction of open arrows 66', 80'; and each of the combination gears is subjected to increased end thrust, namely, the end thrust developed by each respective axial end portion 58', 60' (indicated by solid arrow 72' and hatched arrow 74') supplements rather than opposes the significant end thrust developed in response to the mesh with each respective sun gear (indicated, respectively, by solid arrow 68' and hatched arrow 78').

FIGS. 3c and 4c illustrate a further modification of the assembly in accordance with the invention. In this embodiment, each elongated contiguous meshing area (in mesh with both a respective sun gear and the axial end portion of its paired combination gear) is divided into two distinct meshing areas 59'/63 and 61'/65, each having a respective gear tooth design. Sun gears 51, 53 have respective right and left hand helical teeth which are in mesh with the first engagement portions 63, 65 of combination gears 55, 57. The divided second engagement portion of each combination gear, namely, axial end portions 59, 59' of gear 55 and axial end portions 61, 61' of gear 57, each have helical teeth of similar hand spiral. With this+gear arrangement, the sun gears are thrust against each other as indicated by open arrows 67, 81, while the frictional resistance between each planet combination gear and its respective bearing surface is maximized by the cumulative end thrusts indicated by the respective sets of solid and hatched arrows, namely, the left hand helical teeth of first engagement portion 63 of gear 55 develop end thrust in the direction of solid arrow 69, while the driving right hand helical teeth of axial end portions 59, 59' both develop axial end thrust in the same direction, as indicated by solid arrows 71, 73. Similarly, the left hand helical teeth of end portions 61, 61' of gear 57 are driven clockwise and produce end-thrust forces indicated by hatched arrows 75, 77, the latter being in the same direction as the end-thrust forces developed by driving right hand helical portion 65 (indicated by hatched arrow 79).

Once again, it can be seen that the invention's simple modifications (in FIGS. 3b and 3c) of the original assembly illustrated in FIG. 3a have resulted in significant increases in end-thrust related frictional resistance.

Figure 5:
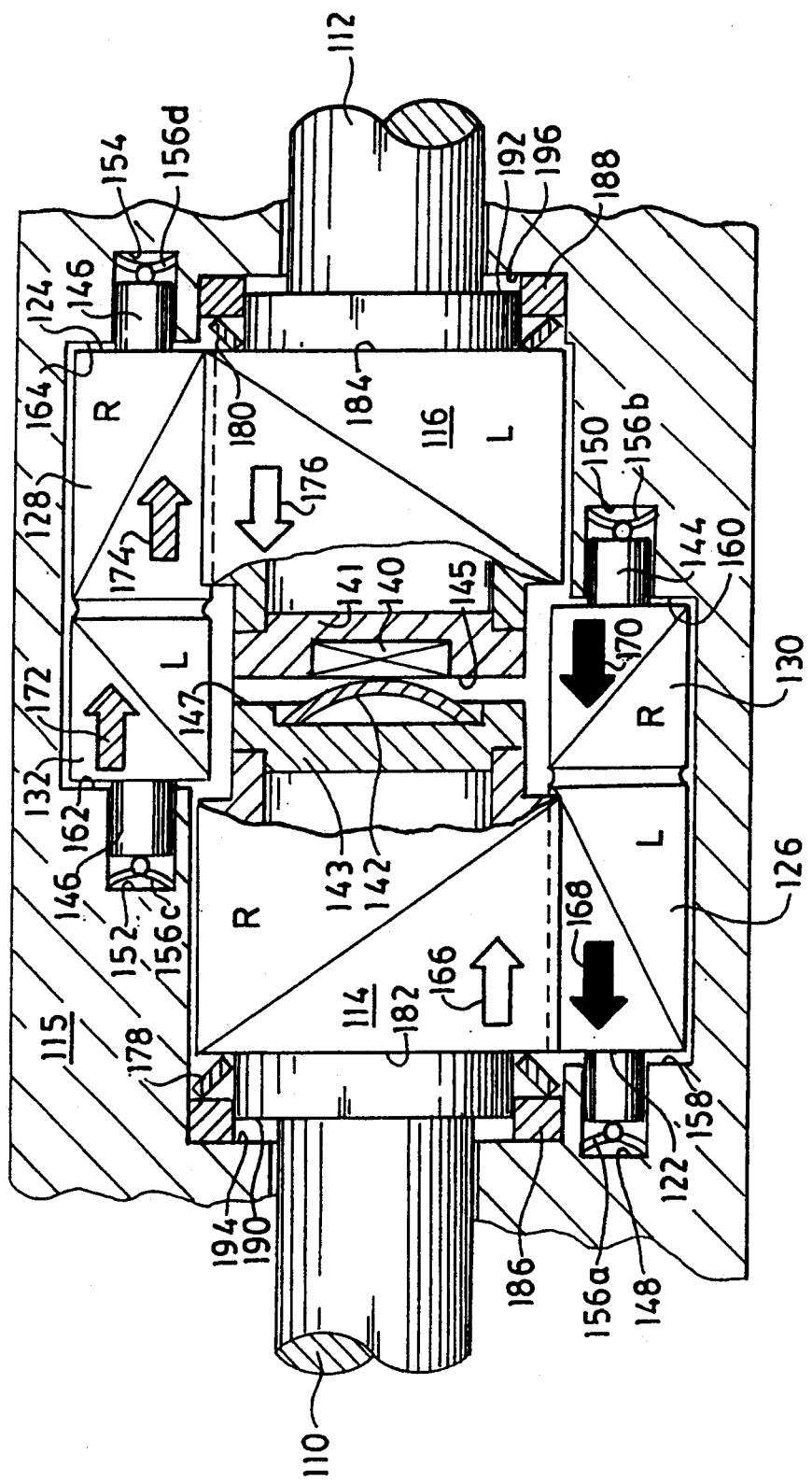

Still another embodiment of the invention is shown schematically in FIG. 5, the various gear elements of this planetary assembly being shown mounted in an appropriate housing. While the housing was omitted from each of the previous drawings to simplify the illustration, each of the previous assemblies include similar housings for supporting the various gear elements and for providing appropriate bearing surfaces to create the frictional resistance needed for producing the torque bias appropriate for torque-proportioning operation.

However, reference is made to commonly-assigned U.S. Pat. No. 5,169,370 for a detailed description of the particular differential assembly disclosed in FIG. 5, since it is not being claimed in this Division.

As indicated above, it has been assumed that the vehicle is being driven forward by its engine and that torque is being divided between the axles such that the sun gear with the lower reference numeral is being subjected to the greater torque in a clockwise direction when viewed from the left hand side of the drawing. It should be noted that if, instead, the opposite sun gear were being subjected to the greater torque, the end-thrust forces indicated by the various arrows in FIGS. 2, 4, and 5 would still remain the same, provided that the vehicle is still being driven forward by its engine. For instance, in FIG. 4a, if torque were being transferred instead from sun gear 52, its left hand helical teeth would also be driving clockwise (when viewed from the left) and, thereby, would still be developing end thrust in the direction of open arrow 80. Similarly, the right hand teeth of first engagement portion 64 of combination gear 56 would be driven counterclockwise and would thereby develop end thrust again in the direction of hatched arrow 78, etc.

On the other hand, when the vehicle is in a "coast" (as different from "drive") mode, the driving torques to which the sun gears are subjected are in a counterclockwise direction, and the end-thrust forces indicated by the various arrows in FIGS. 2, 4, and 5 would all be reversed.

Therefore, the invention herein can be used to increase the end-thrust forces used for determining and controlling the torque bias characteristics of most parallel-axis/torque-proportioning differentials.

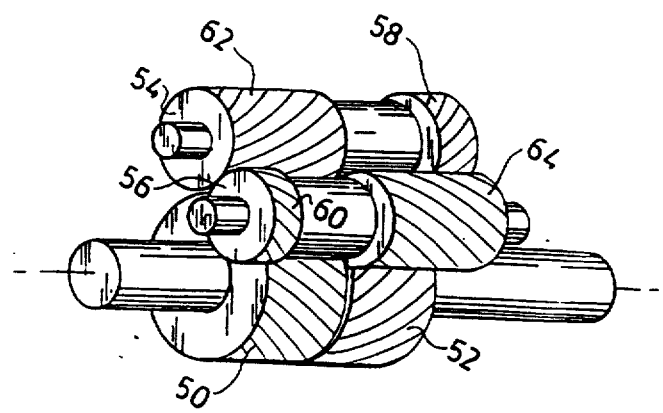

We claim:

1. A gear differential for proportioning the torque between a pair of relatively rotating axles at a predetermined torque bias, said differential comprising:
   a differential housing;
   a pair of sun gears positioned in said housing for receiving the ends of said pair of respective axles for rotation therewith about a common axis;
   at least one pair of planetary combination gears supported in said housing, each respective combination gear in each said pair having a first toothed portion in meshing engagement with a respective one of said sun gears and having a second toothed portion in meshing engagement with its paired combination gear, the meshing engagement of said sun and combination gears interconnecting said respective axle ends in a mutual driving relationship;
   said combination gears being supported in said housing with their respective axes aligned in parallel with the common axis of said sum gears;
   said sun and combination gears having helical teeth of predetermined hand selected to develop axial-thrust forces on said combination gears so that the end faces of said combination gears create frictional resistance for controlling the torque bias of the differential assembly; and
   said first and second toothed portions of a first one of said combination gears of each said pair being separated by a non-meshing portion that straddles the sun gear that is in mesh with its paired combination gear.

2. The gear differential of claim 1 wherein said first and second toothed portions of said first combination gear of each said pair have tooth designs selected so that the meshing engagement of said second portion with its respective combination gear creates axial-thrust forces in the same direction as the axial-thrust forces created by the meshing engagement of said first portion with its respective sun gear.

3. The gear differential of claim 1 wherein said first and second toothed portions of said first combination gear of each said pair have tooth designs selected so that the axial-thrust forces created by the meshing engagement of said second portion with its respective combination gear do not oppose the axial-thrust forces created by the meshing engagement of said first portion with its respective sun gear.

4. The gear differential of claim 1 wherein said first and second toothed portions of both said combination gears of each said pair are separated by a non-meshing portion that straddles the sun gear that is in mesh with its paired combination gear.

5. The gear differential of claim 4 wherein each of said combination gears includes a third said toothed portion in meshing engagement with its paired combination gear, said second and third toothed portion forming two separate areas at which each combination gear meshes with its paired combination gear.

6. The gear differential of claim 5 wherein said two separated areas at which said of each combination gear meshes with its paired combination gear have tooth designs selected so that the axial-thrust forces created by the meshing engagement of one of said separated areas with its said paired combination gear are in the same direction as the axial-thrust forces created by the meshing engagement of its said first portion with its respective sun gear.

7. The gear differential of claim 5 wherein said two separated areas at which said of each combination gear meshes with its paired combination gear have tooth designs selected so that the axial-thrust forces created by the meshing engagement of said paired combination gears do not oppose the axial-thrust forces created by the meshing engagement of its said first toothed portion with its respective sun gear.

8. The gear differential of claim 1 wherein said sun gears have teeth inclined, respectively, at opposite-handed helical angles meshing with said first toothed portion of said combination gears of each pair, and said separated first and second toothed portions of said first combination gear have helical teeth of the same hand.

9. The gear differential of claim 1 wherein said sun gears have teeth inclined, respectively, at helical angles of the same hand meshing with said first toothed portion of said combination gears of each pair, and said separated first and second toothed portions of said first combination gear have helical teeth of the opposite hand.

10. The gear differential of claim 4 wherein said sun gears have teeth inclined, respectively, at opposite-handed helical angles, and said combination gears of each pair have, respectively, two separated sets of gear teeth having helical angles of the same hand.

11. The gear differential of claim 4 wherein said sun gears have teeth inclined, respectively, at helical angles of the same hand, and said combination gears of each pair have, respectively, two separated sets of gear teeth having helical angles of the opposite hand.

12. The gear differential of claim 4 wherein said paired combination gears are in mesh with each other at two separated areas which straddle the respective positions where each combination gear meshes with its associated sun gear, and said separated areas are positioned, respectively, in proximity to the axial ends of the combination gears.

13. The gear differential of claim 1 wherein said first and second toothed portions, of said combination gear that is paired with said first combination gear, are contiguous.

14. The gear differential of claim 13 wherein said contiguous meshing area of said combination gear is divided into two distinct areas for meshing engagement, respectively, with its said paired combination gear and with its said respective sun gear, said two distinct areas having respective gear tooth designs.

15. The gear differential of claim 5 wherein one of said separated areas at which each pair of combination gears mesh is contiguous with the meshing area in which each said combination gear meshes with its respective sun gear.

16. The gear differential of claim 15 wherein said contiguous meshing area of each combination gear is separated from its other area of meshing engagement with its paired combination gear by a spacing area which provides clearance for avoiding contact with the sun gear associated with its paired combination gear.

17. The gear differential of claim 16 wherein:
said sun gears have helical teeth of opposite hand;
said contiguous meshing area of each combination gear is divided into two distinct areas for meshing engagement, respectively, with said paired combination gear and with said respective sun gear, said two distinct areas having respective gear tooth designs; and
said two separated meshing areas where said combination gear meshes with its paired combination gear have helical teeth of same hand.

* * * * *

UNITED STATES PATENT AND TRADEMARK OFFICE
CERTIFICATE OF CORRECTION

PATENT NO.   : 5,366,422
DATED        : Nov. 22, 1994
INVENTOR(S)  : James S. Dye and Gordon B. Tseng It is certified that error appears in the above-identified patent and that said Letters Patent is hereby corrected as shown below:

```
    On the cover page, under item [54], delete "END-THRUST
DESIGN FOR"; and item [60], after 1992, delete "abandoned".
    Column 1, line 1, delete "END-THRUST DESIGN FOR"; line
7, delete "abandoned".
```

Signed and Sealed this

Twenty-fifth Day of April, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,366,422

DATED : November 22, 1994

INVENTOR(S) : James S. Dye, et al

It is certified that error appears in the above-indentified patent and that said Letters Patent is hereby corrected as shown below:

```
The title page, showing the illustrative figure, should be deleted
and substitute therefor the attached title page.

Drawing sheet, consisting of Fig 1A, should be deleted to be replaced
with the drawing sheet, consisting of Fig. 3A, as shown on the
attached page.
```

Signed and Sealed this

Twelfth Day of December, 1995

Attest:

BRUCE LEHMAN

*Attesting Officer*         *Commissioner of Patents and Trademarks*

United States Patent [19]

Dye et al.

[11] Patent Number: 5,366,422
[45] Date of Patent: * Nov. 22, 1994

[54] END-THRUST DESIGN FOR PARALLEL-AXIS DIFFERENTIAL

[75] Inventors: James S. Dye, Walworth; Gordon B. Tseng, Rochester, both of N.Y.

[73] Assignee: Zexel-Gleason USA, Inc., Rochester, N.Y.

[*] Notice: The portion of the term of this patent subsequent to Dec. 8, 2009 has been disclaimed.

[21] Appl. No.: 154,605

[22] Filed: Nov. 18, 1993

Related U.S. Application Data

[60] Division of Ser. No. 986,100, Dec. 4, 1992, abandoned, which is a continuation of Ser. No. 735,441, Jul. 25, 1991, Pat. No. 5,169,370.

[51] Int. Cl.$^5$ .............................................. F16H 1/42
[52] U.S. Cl. ...................................... 475/249; 475/252
[58] Field of Search ................. 475/226, 227, 249, 252

[56] References Cited

U.S. PATENT DOCUMENTS

| | | | |
|---|---|---|---|
| 1,195,314 | 8/1916 | Williams | 475/227 |
| 1,373,657 | 4/1921 | Finefrock | 475/227 |
| 2,000,223 | 5/1935 | Du Pras | 475/227 |
| 2,269,734 | 1/1942 | Powell | 475/227 |
| 2,462,000 | 2/1949 | Randall | 475/227 |
| 2,900,846 | 8/1959 | Lehman | 475/227 |
| 2,972,265 | 2/1961 | Walter | 475/227 |
| 3,095,761 | 7/1963 | Hilado | 475/227 |
| 3,292,456 | 12/1966 | Saari | 475/227 |
| 3,706,239 | 12/1972 | Myers | 475/227 |
| 3,738,192 | 6/1973 | Belansky | 475/227 |
| 4,677,876 | 7/1987 | Dissett | 475/227 |
| 4,916,978 | 4/1990 | Razzelli et al. | 475/226 |
| 5,122,101 | 6/1992 | Tseng | 475/252 |
| 5,169,370 | 12/1992 | Dye et al. | 475/227 |
| 5,232,416 | 8/1993 | Amborn et al. | 475/249 X |

FOREIGN PATENT DOCUMENTS

| | | | |
|---|---|---|---|
| 130806 | 1/1985 | European Pat. Off. | 475/226 |
| 0356401 | 2/1990 | European Pat. Off. | |
| 899549 | 6/1945 | France | |
| 951431 | 10/1949 | France | 475/249 |
| 2256350 | 7/1975 | France | |
| 2566080 | 12/1985 | France | 475/227 |
| 59-97346 | of 1984 | Japan | 475/249 |
| 237300 | 8/1945 | Switzerland | |
| 27123 | of 1912 | United Kingdom | 475/226 |
| 2234791 | 2/1991 | United Kingdom | 475/227 |

Primary Examiner—Dirk Wright
Assistant Examiner—Khoi Q. Ta
Attorney, Agent, or Firm—Eugene Stephens & Associates

[57] ABSTRACT

Frictional resistance, resulting from end thrust developed by planetary gearing, is appreciably increased to improve control over torque bias characteristics in parallel-axis/torque-proportioning automotive differentials using an unusual planetary combination gear having a first toothed portion which meshes with one of the differential's sun/side gears and a second toothed portion which meshes with a paired combination gear, these first and second toothed portions being separated by a non-meshing portion that "straddles" (i.e., that provides clearance for avoiding contact with) the sun gear that is in mesh with its paired combination gear. In the most preferred embodiments, the second toothed portion of each combination gear is divided into two separate and distinct meshing areas located, respectively, at the gear's outer axial ends. The end faces of the combination gears are used as frictional surfaces for controlling the torque bias of the differential assembly, and a significant measure of control over torque bias is provided by the appropriate selection of the angle and hand of the helically-toothed meshing portions of the sun and planetary combination gears, such tooth designs being selected so that the axial-thrust forces created on the combination gears result in additional frictional resistance.

17 Claims, 5 Drawing Sheets